May 19, 1959  J. H. ST. JOHN  2,887,613
SWEEP CIRCUIT
Filed Oct. 23, 1956
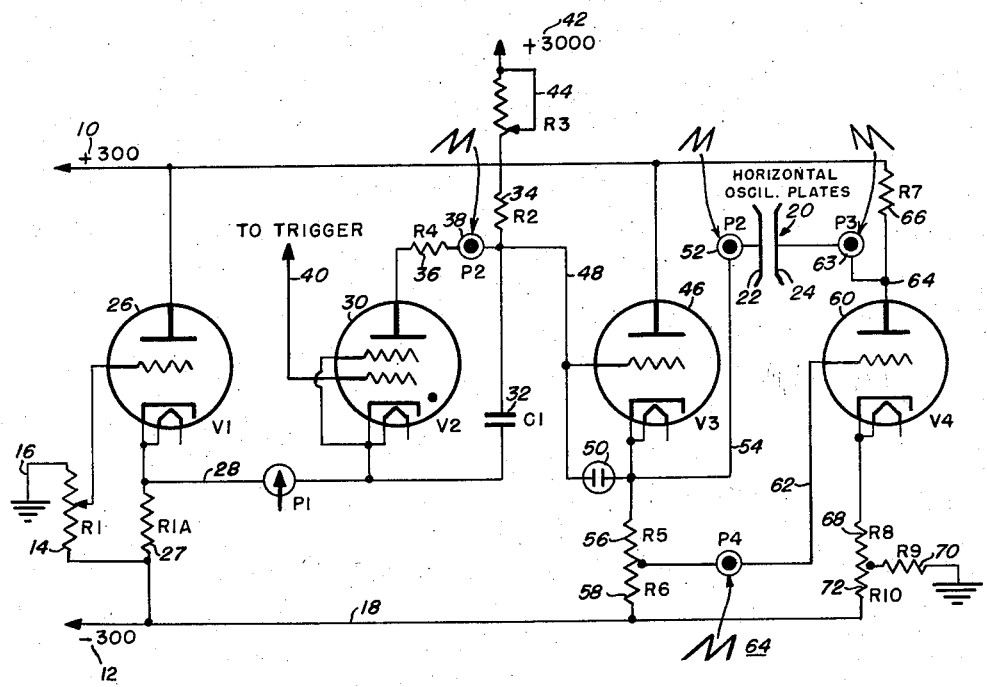
INVENTOR
*JOHN H. ST. JOHN*
BY *Semmes & Semmes*
ATTORNEYS

United States Patent Office 2,887,613
Patented May 19, 1959

2,887,613
SWEEP CIRCUIT

John H. St. John, Bogota, N.J., assignor to Heyer Industries, Inc., Belleville, N.J., a corporation of Delaware Application October 23, 1956, Serial No. 617,778

4 Claims. (Cl. 315—26)

The present invention relates broadly to a sweep or deflection circuit for cathode ray oscilloscopes, and more specifically to such a circuit providing substantially balanced deflection voltages to deflection plates of such a tube to produce balanced scanning down to the lowest scanning frequencies. The circuit of the invention provides stable deflection centering and sweep end points with all scanning frequencies and sweep duty cycles. The circuit includes a unique cathode follower and neon tube arrangement which permits use of very high supply voltage (so as to produce essentially linear sweep without the use of a constant current tube) while using low voltage components. Moreover, the circuit requires no coupling capacitors connected to the deflection plates, but maintains balance of deflection near ground through a unique arrangement employing balanced positive and negative power supplies.

The present invention is primarily designed for use in connection with electrical testing systems, and particularly those for testing and indicating the condition of multicylinder internal combustion engines of the electrical ignition type, utilizing an oscilloscopic display and measurement of the electrical performance of the various components of the system.

In such testing systems a high degree of accuracy is required and additionally there must be ease of reading the depicted patterns. There have been previous devices used to apply electronic measurement and display principles, including the cathode ray oscilloscope, to this problem of analyzing engine performance. One such system which has been found to be effective is disclosed in my copending application, Serial No. 557,567, filed January 5, 1956.

It is an object of the present invention to provide an improved circuit with superior operation and results with respect to my previous system, and with particular reference to use with larger scope cathode ray tubes.

It is also an object of the present invention to provide such a sweep circuit for a cathode ray tube which eliminates sweep excursion control.

Another object of the invention is to provide such a circuit which eliminates the necessity of scanning high gain amplifier tubes, eliminating the need for difficult shielding of low voltage amplifier circuits from interference due to high voltage transients surrounding auto ignition circuitry.

A further object of the present invention is to provide a circuit using a high voltage supply to produce essentially constant current capacitor charging (deflection capacitor) circuit, thereby eliminating the necessity for constant current tubes, etc., usually pentode; and this gives very nearly linear scanning.

Still another object of the invention is to provide a deflection circuit which eliminates most of the drift in deflection centering and width found in conventional D.C. amplifier deflection circuits.

An additional object of the invention is to provide such a circuit employing a combination of a phase inverter and a thyratron, which has the advantage over use of a thyratron alone, especially for large scope cathode ray tubes, in providing balanced or near balanced deflection voltages, that is, one deflection plate is driven positive while the other is driven negative and vice versa.

This combination has outstanding advantages, with importance increasing as tube diameter and/or corresponding deflection voltage/high voltage ratio increases.

In attaining the foregoing principal objects of the invention the circuit also eliminates or minimizes changes in deflection sensitivity of a pair of plates used for signal (normally those producing vertical excursions) with horizontal deflection. These changes with unbalanced deflection result in trapezoidal distortion and tilting of the horizontal base line, both of which are undesirable.

Further it eliminates or minimizes defocusing of the spot otherwise caused by unbalanced horizontal deflection.

Additionally it permits use of unbalanced drive circuitry for the signal plates without excessive pattern distortion, and this eliminates the need for any tubes or other phase splitting circuits for signal input.

This is possible since in most cathode ray oscilloscope electrostatic deflection tubes, the change in deflection sensitivity of the plates furthest from the screen caused by unbalanced drive of plates nearest the screen, is much greater than the change in deflection sensitivity of the plates nearest the screen caused by unbalanced drive of plates farthest from the screen. This permits the plates farthest from the screen to be used for signal with unbalanced drive, if the plates nearest the screen are driven balanced for horizontal (time axis) deflection.

Additional objects, features and advantages of this invention will be apparent from the following detailed description of an embodiment thereof when taken together with the accompanying drawing in which The figure is a schematic view of the electrical components and wiring connections of the novel system of the invention.

In the drawing and following description, only that portion of an overall circuit for visually analyzing the operation of an internal combustion engine is included which is necessary to understand the present invention. Features such as the triggering circuit, and the association of the invention with an internal combustion engine to be tested are not included since not necessary to an understanding of this invention. For details in this connection however, reference can be made to my aforementioned copending patent application, Serial No. 557,567, which by reference thereto is specifically incorporated herein. In the description of a preferred circuit the various tubes and resistances are identified but manifestly changes will be apparent to those skilled in the art.

A high voltage source of the order of +3000 v. or −3000 v. is preferably utilized in the overall circuit and by suitable means voltages of +300 v. and −300 v. with respect to ground are impressed on the circuit of the present invention as indicated at 10, 12. A resistor 14 (25K) grounded at 16 is connected to conductor 18 and constitutes a left sweep excursion control for the cathode ray tube, generally designated 20, the horizontal plates only of which are shown for simplicity, and designated 22 and 24 respectively.

By means of resistor 14, the grid voltage of tube 26 (½AT7) can be controlled, thereby controlling the plate current and hence the potential P1 across resistor 27 (51K) and maintaining this potential essentially constant due to biasing action of current flow through 27 regardless of current drawn through conductor 28, or voltages at 10, 12.

The cathode of thyratron 30 (2D21) is connected to conductor 28. Thyratron 30 together with the resistor condenser circuit, including condenser 32, and resistors 34 (2 meg.), 36 (10 ohms) comprise a sawtooth wave generator, generating a wave as shown at 38. The thyratron is triggered from a source on the engine under test through conductor 40 in a known manner, depending upon the information sought. The thyratron 30 is normally biased to be non-conducting.

Condenser 32 is charged by current from a +3000 v. source, indicated at 42 through resistors 34 (2 meg.) and 44 (25 meg.) at an essentially constant rate, since the total voltage differential across condenser 32 does not exceed approximately 10% of +3000 volts, being limited by the grid current of tube 46 (½AT7) through conductor 48, when the grid thereof goes positive with respect to its cathode, or by current through neon tube 50, whenever tube 46 is not conducting, such as, when the tube is removed or cold.

Resistors 34 and 44 constitute a sweep rate control to control the rate of charge of condenser 32.

Upon the application of a positive trigger pulse to thyratron 30 through conductor 40, the thyratron is made conducting, thereby rapidly discharging condenser 32. When condenser 32 is discharged, thyratron 30 ceases conduction and the sweep cycle starts again. Resistor 36 (10 ohms) acts to safeguard the circuit by limiting the discharge current to a safe value for thyratron 30.

The sawtooth wave generated (300–400 volt P-P) is applied to the grid of tube 46 through conductor 48, and this tube 46 operates as a cathode follower, thus providing high input impedance and linear input-output voltages. Very high impedance input is necessary since resistors 34 and 44 can have values as high as approximately 25 megohms.

Tube 46, which acts as a cathode follower develops essentially the same wave form at its cathode as that applied at its grid, indicated at 52, and this sawtooth wave form is applied to one horizontal deflection plate 22 of cathode ray tube 20 through conductor 54. This sawtooth wave is also applied, at reduced amplitude through action of voltage divider 56, 58, to the grid of tube 60 (½AT7) by conductor 62 and as shown at 64.

Tube 60 in the circuit operates as a degenerative (negative feed back) phase inverter and develops at its plate a voltage of essentially the same shape but of inverted phase to that as shown at 52. This wave form, indicated at 63, is applied to the other horizontal deflection plate 24 of cathode ray tube 20 by conductor 64.

The two voltages of opposite phase, 52 and 63 thus provide "balanced deflection" for the cathode ray oscilloscope, permitting optimum conditions of linearity and focus.

By properly selecting the values of resistors 44, 58, 66, 68, 70 and 72, such, for example only, as 25 meg.; 33K; 100K; 10K; 5K and 10K, tube 60 can be made to develop a slightly nonlinear input/output voltage ratio which corrects for the slight non-linearity of the sawtooth wave previously described.

It should be noted that by virtue of the configuration of the circuit of the invention, when the cathode of tube 46 is at ground potential (considering D.C. conditions), the plate of tube 60 is also at ground potential, and thus both deflection plates 22 and 24 are at ground potential. Furthermore, the voltages at the deflection plates vary inversely from ground potential even under D.C. conditions. Thus the deflection is truly balanced with respect to ground even for the lowest scanning frequencies.

The values given and the tubes selected may of course be varied as will be apparent to those skilled in the art, and minor changes can be incorporated in the circuit without departing from the spirit or scope of the invention as defined by and solely limited by the appended claims.

I claim:

1. A cathode ray deflection circuit or the like with sweep excursion control, comprising a sawtooth generator having a condenser arranged to be charged repetitively from a source of supply, said source having one terminal connected to one side of said condenser, and a cathode follower having a cathode load connecting the other terminal of said source to the other side of said condenser, whereby said sweep excursion is controlled by variation of the conductivity of said cathode follower in response to variations in the current through said load.

2. The circuit of claim 1, further comprising variable grid bias means for adjusting the conductivity of said electronic device to adjust the sweep excursion.

3. A circuit for generating balanced deflection potentials for a cathode-ray tube comprising a first cathode follower, a direct connection from the output of said cathode follower to one deflection plate of said tube, a phase inverting amplifier directly coupled to the output of said cathode follower, a direct connection from the output of said phase inverter to the opposed deflection plate of said cathode-ray tube, a relaxation oscillator having a resistance-capacitance charging circuit connected across a direct current supply, a gaseous discharge device connected across said capacitor, a direct connection coupling the voltage across said condenser to the input of said cathode follower and a second cathode follower having a load resistance connected in series with said charging circuit for varying the conductivity of said second cathode follower in accordance with variational current in said charging path.

4. Apparatus for producing balanced deflection potentials with respect to ground for application to a pair of opposed deflection elements of a cathode-ray tube or the like, comprising a pair of voltage supplies having terminal voltages that are respectively positive and negative with respect to ground by substantially the same amount, a cathode follower electronic device having an anode connected to the positive supply, a cathode connected to the negative supply through a cathode load impedance, and a control grid, a connection from said cathode directly to one of said deflection elements, a phase inverter electronic device having a cathode connected to said negative supply, an anode connected to said positive supply, and a control grid directly connected to a point on said cathode load, a connection from the last mentioned anode directly to the other of said deflection elements, a sawtooth wave generator connected to said control grid of said cathode follower having a condenser that is charged from a source of voltage many times more positive than the voltage at the cathode of said cathode follower, said control grid of said cathode follower being connected to the positive side of said condenser, and said cathode follower having a gaseous discharge tube connected between said control grid of said cathode follower to limit said potential when said cathode follower is non-conducting.

References Cited in the file of this patent

UNITED STATES PATENTS

| 2,439,324 | Walker | Apr. 6, 1948 |
|---|---|---|
| 2,458,367 | Fyler et al. | Jan. 4, 1949 |
| 2,487,602 | Schoenfeld et al. | Nov. 8, 1949 |
| 2,501,857 | Stewart | Mar. 28, 1950 |
| 2,567,667 | Hanchett | Sept. 11, 1951 |
| 2,662,981 | Segerstrom | Dec. 15, 1953 |
| 2,694,145 | Christian | Nov. 9, 1954 |

FOREIGN PATENTS

| 451,117 | Great Britain | July 29, 1936 |